United States Patent [19]

Thyfault

[11] Patent Number: 4,675,192
[45] Date of Patent: Jun. 23, 1987

[54] METHOD OF MAKING WHEAT WINE

[76] Inventor: Ronald Thyfault, Damar, Kans. 67632

[21] Appl. No.: 808,547

[22] Filed: Dec. 13, 1985

[51] Int. Cl.$^4$ ............................ C12G 1/00; C12G 1/08
[52] U.S. Cl. ........................................ 426/12; 426/592
[58] Field of Search ....................... 426/11, 12, 14, 15, 426/18, 592, 51, 52

[56] References Cited

U.S. PATENT DOCUMENTS

| | | |
|---|---|---|
| 410,872 | 9/1889 | Boefer . |
| 412,385 | 10/1889 | Hamlin . |
| 757,352 | 4/1904 | Sanguineti . |
| 825,342 | 9/1906 | Palmer . |
| 1,349,000 | 8/1920 | Kellogg . |
| 3,236,740 | 2/1966 | Smith et al. ............................ 195/32 |
| 3,576,645 | 4/1971 | Rozsa ...................................... 99/31 |
| 3,652,295 | 3/1972 | Rogol et al. ............................ 99/91 |
| 4,035,515 | 7/1977 | Cunningham ......................... 426/14 |
| 4,081,557 | 3/1978 | Azoulay ................................. 426/18 |
| 4,092,434 | 5/1978 | Yoshizumi et al. ................... 426/13 |
| 4,329,433 | 5/1982 | Seebeck et al. ....................... 435/255 |
| 4,343,231 | 8/1982 | Devreux ............................... 99/277.2 |
| 4,514,496 | 4/1985 | Yoshizumi et al. ................. 435/162 |

FOREIGN PATENT DOCUMENTS 0002960  2/1978  Japan ...................................... 426/11

Primary Examiner—Raymond N. Jones
Assistant Examiner—Marianne M. Cintins
Attorney, Agent, or Firm—Zarley, McKee, Thomte, Voorhees & Sease

[57] ABSTRACT

A method of making wheat wine includes mixing wheat, sugar, yeast nutrient, wine tannin, pectic enzyme and sodium bisulfite in water. After a time delay, started yeast is added to the mixed ingredients which are occasionally stirred as fermentation occurs. The solids portion of the mixed ingredients are allowed to settle to the bottom of a liquid portion which is drained off and stored in a separate tank. The wine is periodically racked and is deemed ready for bottling in approximately nine months.

11 Claims, 2 Drawing Figures

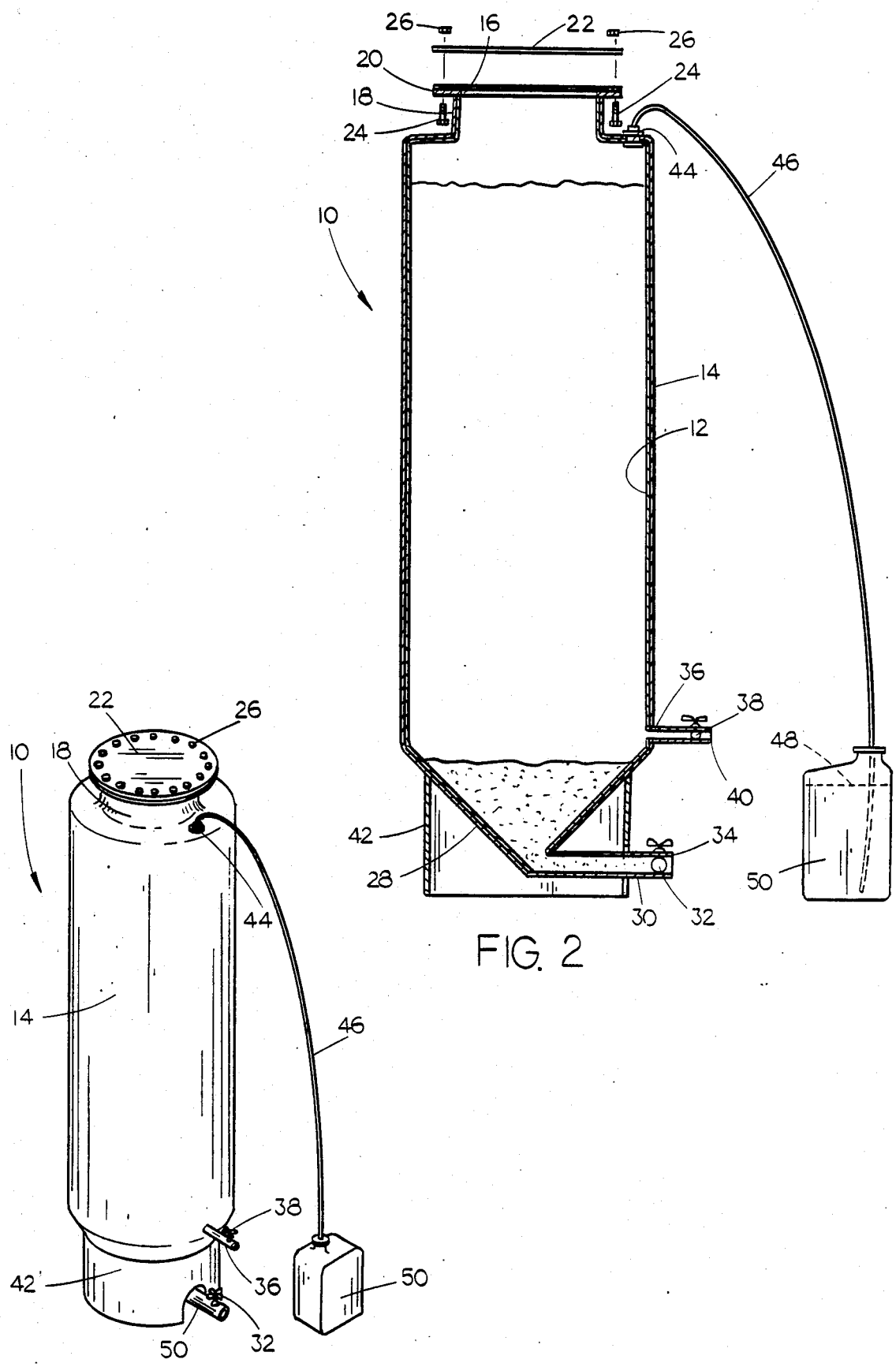

METHOD OF MAKING WHEAT WINE

BACKGROUND OF THE INVENTION

The present invention is directed generally to a wine making process and more particularly to a method of making wine from wheat.

Traditionally, wine has most commonly been prepared from grapes. Other fruits and fruit juices have also previously been used as the basic material from which wine is made.

Cereal grains such as corn, wheat, rice and others can be used in the production of alcohol and starch as disclosed in Smith et al U.S. Pat. No. 3,236,740 and Yoshizumi et al U.S. Pat. No. 4,092,434. Grains are also used in the preparation of spirits such as whiskey or gin. It has not heretofore been known, however, that wheat may be used as a primary base material in the production of wine nor has any method been known for successfully making a wheat wine with a taste closely resembling the white wine produced from grapes.

SUMMARY OF THE INVENTION

The method of making wheat wine, according to the present invention, includes the steps of mixing approximately equal amounts by weight of ground wheat and dissolved sugar with slight amounts of yeast nutrient, wine tannin, pectic enzyme and acid in a quantity of water corresponding to a ratio of between one and a half and three pounds of wheat per gallon of water. After a time delay for the sodium bisulfite to work on any natural yeast in the wheat, started yeast is added to the mixture. Over a period of days, the mixture is stirred occasionally after which a solids portion of the mixed ingredients is allowed to settle to the bottom of the liquid portion thereof. At this stage, the wine is racked to separate the liquid portion from the solids portion. The racked wine is then stored for an extended period of time. During storage, small amounts of enzymes, tannin, acid and sugar may be added to adjust the taste of the wine product.

Whereas the wineries that use fresh grapes can produce only a few months during the year, wineries that use wheat can produce all year. Furthermore, since wheat prices are relatively very low, wheat wine can be produced considerably cheaper than grape wine. Furthermore, when the process is done, the ground wheat that is left over, called "must", can be fed to livestock with the result that the base wheat material can cost the winery little if anything. Certainly the value of a wheat crop is substantially enhanced by using it for the production of wine.

BRIEF DESCRIPTION OF THE DRAWINGS

FIG. 1 is a perspective view of a tank adapted for small scale production of wheat wine; and FIG. 2 is an enlarged sectional view of the tank of FIG. 1.

DESCRIPTION OF THE PREFERRED EMBODIMENT

Whereas wine can be made in quantities ranging from less than five gallons to batches of thousands of gallons, the method of making wheat wine according to the present invention is described herein in connection with a specific example wherein a 250 gallon batch of wheat wine is produced.

The apparatus in which the wine is made is shown in FIGS. 1 and 2 as including a double wall tank 10 having an inner wall 12, preferably of stainless steel or copper, and an outer wall 14 of fiberglass. The top of the tank has a large opening 16 defined by a raised neck portion 18 terminating in an outwardly directed annular flange 20. A round cover 22 is adapted to close and seal the opening 16 and a plurality of bolts 24 are insertable through registered holes in the flange 20 and cover 22 for securing the cover onto the flange with nuts 26. Opening 16 is large enough to facilitate access to the interior of the tank for cleaning it.

Tank 10 is basically cylindrical but includes a frusto-conical lower portion 28 which tapers downwardly toward the inner end of a solids discharge conduit 30 equipped with a shut-off valve 32 and outlet end 34.

When wine in the tank is racked, the liquid portion is drawn off through the liquid discharge conduit 36, also equipped with a shut-off valve 38 and having an outlet end 40. The tank is supported on a generally cylindrical stand 42.

A 1-inch diameter vent outlet 44 opens through an upper portion of the tank for venting gases through a ⅜-inch plastic hose 46, the lower end of which is immersed within water 48 in a separate receptacle 50 to bubble the gases given off from tank 10.

In the preferred embodiment, tank 10 is designed to have a capacity of 250 gallons. The solids discharge conduit 30 has a 2-inch diameter and the liquid discharge conduit 36 has a 1-inch diameter. Top opening 16 is 18-inches in diameter.

The first step for making wheat wine is to fill a first tank 10 with the following ingredients, the indicated quantities corresponding to one specific example:

(1) 500 pounds ground wheat;
(2) 500 pounds sugar dissolved to bring the specific gravity to 1.110;
(3) 2.7 pounds of yeast nutrient;
(4) 1 pound wine tannin;
(5) ½ pound pectic enzyme;
(6) 8 pounds tartic acid;
(7) 1 pound sanitizing agent such as sodium bisulfite; and
(8) water.

More wheat may be added for more body. Wine tannin is natural in grape wine but it has been found necessary to add wine tannin even in the production of grape wine in certain years. The pectic enzyme has no affect on taste but is used to make the solids settle out, thereby producing a clearer wine.

It is not critical that the acid be pectic acid. Ten pounds of a citric acid could be substituted, for example. The acid tends to give a sting to the tongue which is desirable for wine.

The sugar is first dissolved and tested with a hydrometer to bring the the specific gravity to 1.110.

The sodium bisulfite operates to kill the natural yeast that is in the wheat since the inferior bacteria that would be produced thereby is undesirable. The sodium bisulfite is gone after about 24 hours. It is used again before the wine is finally bottled.

After the tank is filled with the above ingredients, about 50 gallons of juice are removed through outlet value 38 to provide space within the tank. The ingredients are left in the tank for about 24 hours to give the sodium bisulfite time to work.

The next step is to add one pound of started yeast. The amount of yeast is not critical since it grows. A dry, live yeast is used and may be premixed with fruit juice to activate it.

In a 250 gallon tank, it takes about 36 hours for the fermentation to get wild. In the specific example described herein, the tank boiled over on the fourth day, losing 50 gallons of liquid. On the fifth day, 100 pounds of wheat and 100 pounds of dissolved sugar were added. On the seventh day, the 50 gallons of juice that had been removed from the tank were added back with one gallon of lemon juice. This filled the tank 10 to the neck 18.

On the eighth day, the tank was pumped for about 15 minutes to stir the ingredients. The wine may be stirred by drawing wine from the tank through the top vent outlet 44 and a suitable conduit to a liquid pump having its output connected to the discharge conduits 30. Alternatively, large winery tanks will generally be provided with a mechanical mixer or agitator for the solids in the tank. On the ninth day, the liquid was again pumped for about 15 minutes.

On the tenth day, the ingredients were separated by pumping the liquid out the upper discharge conduit 36 and into a second tank 10. The remaining solids or "must" in the bottom of the tank were discharged through the lower conduit 30 and were used as feed for pigs. About three gallons of brown thick solids were removed.

To adjust the specific gravity of the saved liquid, 50 pounds of sugar were added together with one quart of lemon juice for acid.

One month later, the wine was racked, i.e. when the liquid was drained off through conduit 36 to another clean tank, with the solids being drained off through conduit 30 for discharge or use as additional livestock feed. At this stage the wine tasted flat and acid was ordered.

One month later, the wine was again racked and the following ingredients were added: 1 pound enzymes, ½ pound tannin and 8 pounds tartic acid.

One month later, the wine was again racked. The wine was sampled and tasted back to normal. About one teaspoon of pineapple flavoring and one cup of sugar per gallon of wine were added. About four gallons of the wine were removed for others to sample. The pineapple flavoring was added to hide the smell of the yeast remaining in the wine. After storing the wine for an additional two months, the yeast and associated smell were substantially gone with the result that pineapple flavoring, for example, was no longer needed.

After the third month, the wine was racked every two months. For each time the wine is racked, the tank is cleaned by adding sodium bisulfite or a similar sanitizing agent. About nine months after the process was started, the wine was deemed ready for bottling. The resulting product was a slightly sweet white wine having a taste which was reported to make one think of a cluster of ripe dew-covered grapes.

Whereas the wheat wine that is produced is somewhat dry, a semi-sweet wine may be made by adding a cup of dissolved sugar per gallon of wine. More sugar can be added for a sweeter wine. Champagne may be produced by adding yeast powder when bottling the wheat wine.

Whereas the method of making wheat wine has been described in connection with a specific example, it is apparent that many modifications, additions and substitutions may be made which are within the intended broad scope of the appended claims. For example, the quantity of the various ingredients may be varied within the following approximate ranges: 1 to 4 pounds of wheat per gallon of water; 1 to 4 pounds of sugar per gallon of water; 6–12 pounds of acid per 250 gallons of water and ½ to 1½ pounds live yeast per 250 gallons of water. The quantity of tannin, pectic enzyme and sodium bisulfite may also be varied within a range of approximately plus or minus 40 percent.

Ranges of proportions for the ingredients are specified to accommodate different tastes and processes. Generally, higher proportions of wheat produces a wine with more body. More sugar will generally result in the production of more alcohol except in certain processes where the wine is "killed" by the addition of a sanitizing agent such as sodium bisulfite or potassium sorbate so that the remaining sugar will contribute to the sweetness of the wine product.

The pectic enzyme is added to clarify the wine. Machines are available for mechanically clarifying the wine, thereby reducing the necessary storage time prior to bottling.

Thus there has been shown and described a method of making wheat wine which accomplishes at least all of the stated objects.

I claim:

1. A method of making wine from wheat, comprising,
   providing the following ingredients: wheat which contains natural yeast, yeast nutrient, wine tannin, acid, sugar, a sanitizing agent, water and live yeast,
   mixing the wheat which contains natural yeast, nutrient, wine tannin, acid, sugar, sanitizing agent and water together,
   allowing the sanitizing agent in the mixed ingredients to kill the yeast which is present in the wheat and then adding the live yeast to the mixed ingredients,
   said mixing step including mixing between 1 and 4 pounds of wheat per gallon of water; mixing between 1 and 4 pounds of sugar per gallon of water; adding wine tannin in a proportion of between plus and minus 40 percent of approximately 1 pound wine tannin per 250 gallons of water; adding acid in a proportion of approximately 6 to 12 pounds of acid per 250 gallons of water; mixing yeast nutrient in a proportion of between plus and minus 40 percent of approximately 1 pound yeast nutrient per 250 gallons of water, adding the sanitizing agent in a proportion of between plus and minus 40 percent of approximately one pound sanitizing agent per 250 gallons of water;
   allowing a solids portion of the mixed ingredients to settle to the bottom of a liquid wine portion thereof,
   separating the liquid wine portion from the solids portion, and storing the separated liquid wine portion.

2. The method of claim 1 wherein said mixing step includes adding pectic enzyme in a proportion of approximately ½ pound pectic enzyme per 250 gallons of water.

3. The method of claim 1 wherein adding the live yeast includes adding live yeast in a proportion of approximately ½ to 1½ pounds live yeast per 250 gallons of water.

4. The method of claim 1 wherein said sanitizing agent comprises sodium bisulfite.

5. The method of claim 1 further comprising stirring the mixed ingredients.

6. The method of claim 1 further comprising clarifying the liquid wine portion.

7. The method of claim 6 wherein said clarifying step comprises adding pectic enzyme in said mixing step.

8. The method of claim 1 wherein said sanitizing agent is allowed to kill the yeast for a period of approximately 24 hours prior to the addition of the live yeast.

9. The method of claim 1 further comprising providing a mixing tank including an outlet adjacent an upper end thereof, a separate liquid receptacle and a conduit having one end in fluid communication with said outlet and an opposite end submersed in liquid in said receptacle.

10. The method of claim 1 further comprising racking the liquid wine portion and saving the racked liquid wine product.

11. The method of claim 10 further comprising adding sugar to the wine product to adjust the taste thereof.

* * * * *